United States Patent
Xu et al.

(10) Patent No.: US 10,167,393 B2
(45) Date of Patent: Jan. 1, 2019

(54) POLY(VINYL ACETATE) DISPERSION, AND A PAINT FORMULATION COMPRISING THEREOF

(71) Applicants: Dow Global Technologies LLC, Midland, MI (US); Rohm and Haas Company, Philadelphia, PA (US)

(72) Inventors: Jianming Xu, Shanghai (CN); Wei Cui, Shanghai (CN); Qingwei Zhang, Shanghai (CN); Ling Li, Shanghai (CN); Danping Ma, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/325,512

(22) PCT Filed: Jul. 28, 2014

(86) PCT No.: PCT/CN2014/083119
§ 371 (c)(1),
(2) Date: Jan. 11, 2017

(87) PCT Pub. No.: WO2016/015192
PCT Pub. Date: Feb. 4, 2016

(65) Prior Publication Data
US 2017/0145221 A1    May 25, 2017

(51) Int. Cl.
| | | |
|---|---|---|
| *C09D 4/00* | (2006.01) | |
| *C08F 218/08* | (2006.01) | |
| *C08F 228/02* | (2006.01) | |
| *C08F 230/02* | (2006.01) | |
| *C09D 131/04* | (2006.01) | |
| *C08F 2/24* | (2006.01) | |
| *C08F 220/18* | (2006.01) | |
| *C08F 222/02* | (2006.01) | |

(52) U.S. Cl.
CPC ............... *C09D 4/00* (2013.01); *C08F 2/24* (2013.01); *C08F 218/08* (2013.01); *C09D 131/04* (2013.01)

(58) Field of Classification Search
None
See application file for complete search history.

(56) References Cited

U.S. PATENT DOCUMENTS

| 4,522,973 A | 6/1985 | Ley et al. |
| 5,663,224 A * | 9/1997 | Emmons ............... C08J 3/215 523/210 |
| 6,492,451 B1 * | 12/2002 | Dersch ............... C03C 17/009 524/430 |
| 6,673,854 B2 | 1/2004 | Pierre et al. |
| 6,790,272 B1 | 9/2004 | Zhao et al. |
| 7,357,949 B2 | 4/2008 | Trogolo et al. |
| 7,579,081 B2 | 8/2009 | Brown |
| 7,611,548 B2 | 11/2009 | Jang et al. |
| 7,820,754 B2 * | 10/2010 | Betremieux ............ C08F 2/22 524/556 |
| 8,293,825 B2 | 10/2012 | Terrenoire et al. |
| 9,005,397 B2 | 4/2015 | Przybyla et al. |
| 9,676,958 B2 | 6/2017 | Nogai et al. |
| 2004/0122131 A1 * | 6/2004 | Brown ................... C08K 3/013 523/160 |
| 2010/0056696 A1 * | 3/2010 | Poole ................... C09D 131/04 524/501 |
| 2010/0240822 A1 | 9/2010 | Trezzi et al. |

FOREIGN PATENT DOCUMENTS

| EP | 2351801 A1 | 8/2011 | |
| GB | 1198929 A * | 7/1970 | ............ C09D 131/04 |
| IL | 103859 A | 10/1996 | |
| JP | 63265972 A * | 11/1988 | |
| KR | 101129449 B1 | 3/2012 | |
| SU | 765284 A1 | 9/1980 | |
| WO | 9311183 A1 | 6/1993 | |
| WO | 2010074865 A1 | 7/2010 | |
| WO | 2013145833 A1 | 10/2013 | |
| WO | 2013163808 A1 | 11/2013 | |

OTHER PUBLICATIONS

Solvay "SIPOMER Resin Modifiers"; Jan. 1, 2012; pp. 28-34 (http:www.stobec.com/DATA/PRODUIT/1711 'v'data_8771.pdf).
International Search Report for International Application No. PCT/CN2014/083119; International Filing Date Jul. 28, 2014; dated Mar. 27, 2015; 5 pages.
Written Opinion of the International Search Report for International Application No. PCT/CN2014/083119; International Filing Date Jul. 28, 2014; dated Mar. 27, 2015; 3 pages.

* cited by examiner

*Primary Examiner* — Nicole M. Buie-Hatcher
(74) *Attorney, Agent, or Firm* — Karl E. Stauss; Cantor Colburn LLP

(57) ABSTRACT

The present invention provides a polymer dispersion comprising by dry weight based on total dry weight of the polymer particles, a) from 60% to 95% a vinyl acetate monomer, b) from 0.2% to 2.5% a phosphorus-containing allylic monomer; and c) from 0.2% to 2.5% an itaconic acid monomer; wherein the total amount of monomers b) and c) is from 0.5% to 2.5% by dry weight based on total dry weight of the polymer particles, and the dry weight ratio of monomer b) to monomers b) and c) is from 0.2 to 0.6. The present invention further provides a paint formulation of PVC higher than 60% comprising the polymer dispersion.

9 Claims, No Drawings

POLY(VINYL ACETATE) DISPERSION, AND A PAINT FORMULATION COMPRISING THEREOF

FIELD OF THE INVENTION

The present invention relates to a poly(vinyl acetate) dispersion. Especially, the present invention relates to a high pigment volume concentration (PVC) paint formulation comprising the poly(vinyl acetate) dispersion.

INTRODUCTION

Poly(vinyl acetate) dispersions are used in the paint industry because they are cost-efficient and environmental friendly compared to other polymer dispersions commonly used in the industry, and therefore provide better hiding efficiency to the paint formulation. However, they are not good at providing competitive washability and early chalking resistance, especially in paints with PVC higher than 60%.

Research has been conducted and it is discovered that phosphorus-containing monomers such as phosphoethyl methacrylate (PEM) can dramatically improve paint washability, but, unfortunately, brings stability issues to the paints.

It is therefore desired in the paint industry polymer dispersions providing satisfactory paint stability, washability, and early chalking resistance to the paint formulation.

SUMMARY OF THE INVENTION

The present invention provides a polymer dispersion comprising by dry weight based on total dry weight of the polymer particles, a) from 60% to 95% a vinyl acetate monomer, b) from 0.2% to 2.5% a phosphorus-containing allylic monomer; and c) from 0.2% to 2.5% an itaconic acid monomer; wherein the total amount of monomers b) and c) is from 0.5% to 2.5% by dry weight based on total dry weight of the polymer particles, and the dry weight ratio of monomer b) to monomers b) and c) is from 0.2 to 0.6.

The present invention further provides a paint formulation of PVC higher than 60% comprising the polymer dispersion.

DETAILED DESCRIPTION OF THE INVENTION

The present invention provides a polymer dispersion of polymer particles comprising, by dry weight based on total dry weight of the polymer particles, a) from 60% to 95%, preferably from 65% to 90%, and more preferably from 70% to 85%, a vinyl acetate; b) from 0.2% to 2.5%, preferably from 0.4% to 2.0%, and more preferably from 0.8% to 1.5%, a phosphorous-containing allylic monomer; and c) from 0.2% to 2.5%, preferably from 0.4% to 2.0%, and more preferably from 0.8% to 1.5%, an itaconic acid.

The total amount of monomers b) and c) is from 0.5% to 2.5%, preferably from 0.7% to 2.0%, and more preferably from 1.0% to 1.5% by dry weight based on total dry weight of the polymer particles.

The dry weight ratio of monomer b) to monomers b) and c) is from 0.2 to 0.6, preferably from 0.25 to 0.55, and more preferable from 0.3 to 0.5.

The phosphorus-containing allylic monomer has a chemical structure of formula (I):

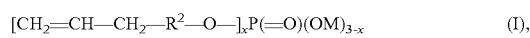

$$[CH_2=CH-CH_2-R^2-O-]_xP(=O)(OM)_{3-x} \quad (I),$$

wherein:
$R^2$ is a linking divalent group, preferably a (poly)oxyalkylene group,
x is an average number of from 1 to 2, and
M, identical or different, is a hydrogen atom or a cationic counter-ion.

If M is a hydrogen atom, the phosphorus-containing allylic monomer is considered as being in an acid form. If M is a counter-ion, the allylic monomer is considered as being in a salt form or in a neutralized form. M is $NH_4^+$, $Na^+$ or $K^+$. The phosphorus-containing allylic monomer can be partially acidic and partially neutralized. Neutralization can occur upon addition of the monomer in the polymerization medium.

The phosphorus-containing allylic monomer can be a mixture of a phosphate mono-ester with x=1, and a phosphate di-ester with x=2. The respective amounts of mono-ester and di-ester are such that x is equal to or higher than 1, for example, equal to or higher than 1.01, and equal to or lower than 2, for example, equal to or lower than 1.99. Number x is preferably from 1 to 1.5, more preferably from 1 to 1.2, and most preferably from 1.01 to 1.2. It is mentioned that x=1.2 corresponds to a molar ratio mono-ester/di-ester of 80/20.

Group $R^2$ is a linking divalent group, preferably comprising carbon atoms, and optionally hetero atoms. Examples of group $R^2$ include divalent alkylene groups with from 2 to 20 carbon atoms and (poly)oxyalkylene groups.

Preferably group $R^2$ is a (poly)oxyalkylene group of formula $-[O-A-]_n-$, wherein: A, identical or different, is a group of formula $-CH_2-CH_2-$ or $-CH_2-CH(CH_3)-$, or $-CH(CH_3)-CH_2-$, and
n is an average number of at least 1.

Groups $-O-A-$ wherein A is $-CH_2-CH_2-$ correspond to ethoxy groups that can be obtained from ethylene oxide. Groups $-O-A-$ wherein A is $-CH_2-CH(CH_3)-$ or $-CH(CH_3)-CH_2-$ correspond to propoxy groups that can be obtained from propylene oxide. (Poly)oxyalkylene groups of formula $-[O-A-]_n-$ can comprise both ethoxy groups and propoxy groups, arranged randomly or by blocks.

Preferably $R^2$ is a polyoxyethylene group of formula $-[O-CH_2-CH_2]_n-$, wherein n is an average number of from 2 to 10, preferably of from 2.5 to 7.

Suitable examples of the phosphorus-containing allylic monomers with formula (I) include SIPOMER™ COPS-3 and SIMMER PAM-5000 both commercially available from Solvay Company.

The polymer dispersion of the present invention may further comprise by dry weight based on total dry weight of the polymer particles, from 1% to 40%, preferably from 5% to 35%, and more preferably from 10% to 30%, an ethylenically unsaturated nonionic monomer.

As used herein, the term "nonionic monomer" refers to the monomer that does not bear an ionic charge between pH=1-14. Examples of suitable ethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and any combination thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); butadiene; α-olefins such as ethylene, propylene, and 1-decene; vinyl butyrates, vinyl versatates and other vinyl esters such as versatic vinyl ester; vinyl monomers such as vinyl chloride and vinylidene chloride; glycidyl (meth)acrylate; and any combination thereof. Commercially available versatic vinyl esters include Veova™ 8, Veova™ 9, Veova™ 10 and Veova™ 11 from Momentive Specialty Chemicals.

Preferably, the ethylenically unsaturated nonionic monomer is selected from versatic vinyl esters, butadiene, α-olefins, $C_2$-$C_{12}$ alkyl esters of (methyl) acrylic acids, any derivative thereof, and any combination thereof.

The polymer dispersion of the present invention may further comprise, by dry weight based on total dry weight of the polymer particles, from 0.01% to 5%, preferably from 0.1% to 3%, and more preferably from 0.3% to 2%, a stabilizer monomer.

Suitable examples of the stabilizer monomers include sodium styrene sulfonate (SSS), sodium vinyl sulfonate (SVS), 2-acrylamido-2-methylpropanesulfonic acid (AMPS), acrylamide (AM), and any combination thereof. Preferably, the stabilizer monomer is selected from SVS, AMPS, and the combination thereof.

The polymer dispersion may further comprise by dry weight based on total dry weight of the polymer particles, up to 3%, preferably from 0.05% to 1.5%, more preferably from 0.1% to 1%, an alkoxysilane functionalized monomer. Suitable examples of the alkoxysilane functionalized monomers include vinyltrialkoxysilane such as vinyltrimethoxysilane and alkylvinyldialkoxysilane, (meth)acryloxyalkyltrialkoxysilane such as (meth)acryloxyethyltrimethoxysilane and (meth)acryloxypropyltrimethoxysilane, any derivatives thereof, and any combination thereof.

The polymerization of the polymer particles can be any method known in the art, including emulsion polymerization, mini-emulsion polymerization, and mechanical dispersing technology. Suitable examples of the polymerization process include those disclosed in U.S. Pat. No. 7,579,081 B2, U.S. Pat. No. 7,357,949 B2 and WO 2010074865 A1.

The polymer dispersion of the present invention can be made into a paint formulation by addition of pigments, extenders, and paint additives.

Pigments of the present invention are typically inorganic pigment particles, and preferably particulate inorganic materials which are capable of materially contributing to the opacity or hiding capability of a paint. Such materials typically have a refractive index of equal to or greater than 1.8 and include titanium dioxide ($TiO_2$), zinc oxide, zinc sulfide, barium sulfate, and barium carbonate. Titanium dioxide ($TiO_2$) is preferred.

Extenders are typically a particulate inorganic materials having a refractive index of less than or equal to 1.8 and greater than 1.3 and include calcium carbonate, clay, calcium sulfate, aluminosilicate, silicate, zeolite, mica, diatomaceous earth, solid or hollow glass, and ceramic bead.

The paint formulation of the present invention may further contain at least one conventional paint additives such as coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, antiskinning agents, colorants, flowing agents, crosslinkers, and anti-oxidants.

In a preferred embodiment, the paint PVC is higher than 60%, preferably higher than 65%, and more preferably higher than 70%.

PVC (pigment volume concentration) of a paint is calculated as follows,

PVC (%)=[volume of pigment(s)+volume of extender(s)]/total dry volume of paint.

The preparation of the paint formulation involves the process of selecting and admixing appropriate paint ingredients in the correct proportions to provide a paint with specific processing and handling properties, as well as a final dry paint film with the desired properties.

The paint formulation may be applied by conventional application methods such as brushing, roller application, and spraying methods such as air-atomized spray, air-assisted spray, airless spray, high volume low pressure spray, and air-assisted airless spray.

Suitable substrates for paint application include concrete, cement board, medium-density fiberboard (MDF) and particle board, gypsum board, wood, stone, metal, plastics, wall paper and textile, etc. Preferably, all the substrates are pre-primed by waterborne or solvent-borne primers.

EXAMPLES

I. Raw Materials

| Abbreviation | Chemicals |
|---|---|
| BA | butyl acrylate |
| VA | vinyl acetate |
| IA | itaconic acid |
| SVS | sodium vinyl sulfonate |
| AMPS | 2-acrylamido-2-methyl-1-propanesulfonic acid sodium |
| SPS | sodium persulfate |
| t-BHP | tert-butyl hydroperoxide |
| IAA | isoascorbic acid |
| EDTA | ethylene diamina tetra-acetic acid |

| Commercial Products | |
|---|---|
| Material | Supplier |
| VEOVA ™ 10 monomer | Momentive Specialty Chemicals |
| RHODAFAC ™ RS-610/A25 surfactant | Solvay Company |
| SIPOMER ™ COPS-3 monomer | Solvay Company |
| TERGITOL ™ 15-S-40 surfactant | The Dow Chemical Company |
| SILQUEST ™ A-171 monomer | Momentive Specialty Chemicals |
| CELLOSIZE ™ QP-30000 thickener | The Dow Chemical Company |
| ACRYSOL ™ TT-935 thickener | The Dow Chemical Company |
| DISPELAIR CF-246 defoamer | Blackburn Chemical Company |
| AMP-95 neutralizer | The Dow Chemical Company |
| OROTAN ™ 1288 dispersant | The Dow Chemical Company |
| TRITON ™ BD-405 wetting agent | The Dow Chemical Company |
| SR-237 titanium dioxide | ShangDong DongJia Group |
| DB-80 calcined clay | Guangfu Building Materials Group |
| ASP ™ 170 extender | BASF Corporation |
| CC-700 calcium carbonate | Guangfu Building Materials Group |
| ROCIMA ™ 363 biocide | The Dow Chemical Company |
| KATHON ™ LXE biocide | The Dow Chemical Company |
| TEXANOL ™ coalescent | Eastman Chemical Company |
| Propylene glycol | Sinopharm Chemical Reagent Co., Ltd. |

II. Test Procedures

1. Washability

Paint drawdown was performed on a panel by using a 175 um film caster, starting from the secured end of the panel. Paint drawdown was then air-dried horizontally for 7 days in a Constant Temperature Room (CTR). A brush was soaked in soap water overnight before use, and was then mounted in a holder with the brush's bristle-side down to start the test. The scrub media was a 0.5% soap solution. More soap solution may be added onto paint drawdown if needed. The number of cycles for removing completely the paint drawdown was recorded. The number of cycles for comparative example 1 was recorded as 100%, and the numbers of cycles for other examples were relative percentage values compared to that of comparative example 1.

2. Paint Stability

A Stormer viscometer was used to test the viscosity of a paint formulation according to the ASTM (American Society for Testing and Materials) D562 method. After the paint formulation was formed and stored at room temperature overnight, an initial medium shear viscosity, Initial KU, of the paint formulation was tested at room temperature. The paint formulation was then placed in an oven at 50° C. for 10 days. The viscosity of the paint formulation after storage was tested and recorded as Final KU. The absolute value difference between Initial KU and Final KU was defined as the viscosity change, ΔKU. The smaller the total ΔKU value was, the better the viscosity stability was.

3. Early Chalking Resistance

Early chalking resistance was detected according to ASTM D4214-07 Method. The test included the evaluation of the degree of chalking on white paint films, that is, the chalk transferred to a fabric compared to photographic reference standards. The chalk rating for each paint sample was recorded. The higher the rating was, the better the early chalking resistance was.

III. Experimental Examples

1. Preparation for the Polymer Dispersions

A monomer emulsion was prepared by mixing 249 g BA, 1387.4 g VA, 14.17 g SVS, 4.96 g SILQUEST A-171 monomer, 8.27 g IA, 20.48 g (40% active) SIPOMER COPS-3 monomer, 13.61 g TERGITOL 15-S-40 surfactant (70% active), 66.16 g RHODAFAC RS-610/A25 surfactant (25% active) and 310.35 g de-ionized (DI) water and emulsifying with stirring. 590 g DI water and 90 g of the monomer emulsion were charged to a five-liter multi-neck flask fitted with mechanical stirring. The contents of the flask were heated to 84° C. under a nitrogen atmosphere. 0.02 g FeSO$_4$.7H$_2$O and 0.02 g EDTA in 5 g DI water, 3.51 g SPS and 0.31 g sodium acetate in 31 g DI water were added to the stirred flask. The remainder of the monomer emulsion, 3.51 g SPS in 66 g DI water, and 0.75 g IAA in 66 g DI water were added to the flask gradually over 180 minutes. Reaction temperature was maintained at 75° C. Then, 30 g DI water was used to rinse the feed line of the flask, and 4.2 g t-BHP in 60 g DI water and 3.23 g SBS in 60 g water were fed into the flask over 30 min with agitation. The content of flask was cooled to room temperature. 1.5 g NaOH in 28.5 g DI water was added as neutralizer over 10 min to get the Polymer Dispersion 1.

Polymer Dispersions (PD) 2 to 7 and Comparative Polymer Dispersions (Comp. PD) 1 to 6 were prepared according to the preparation for the Polymer Dispersion 1 with different amounts of COPS-3 and IA as listed in Table 1.

Polymer Dispersion 7 used 249 g VEOVA 10 monomer replacing BA.

The particle sizes of each Polymer Dispersion were tested by a BI-90 Particle Size Analyzer commercially available from Brookhaven Instruments Corporation.

The Solids of each Polymer Dispersion were tested in a 150° C. oven for 40 min.

TABLE 1

| Example | IA (%) | COPS-3 (%) | IA + COPS-3 (%) | COPS-3/ (IA + COPS-3) | Solids (%) | Particle size (nm) |
|---|---|---|---|---|---|---|
| PD 1 | 0.5 | 0.5 | 1 | 0.5 | 51.43 | 220 |
| PD 2 | 0.5 | 0.75 | 1.25 | 0.6 | 50.97 | 219 |
| PD 3 | 0.3 | 0.2 | 0.5 | 0.4 | 50.68 | 226 |
| PD 4 | 1 | 0.5 | 1.5 | 0.33 | 51.04 | 212 |
| PD 5 | 1 | 1.5 | 2.5 | 0.6 | 50.24 | 207 |
| PD 6 | 0.8 | 0.2 | 1 | 0.2 | 51.7 | 207 |
| PD 7 | 0.5 | 0.5 | 1 | 0.5 | 50.98 | 216 |
| Comp. PD 1 | 0 | 0 | 0 | — | 50.34 | 213 |
| Comp. PD 2 | 0 | 1 | 1 | 1 | 51.49 | 201 |
| Comp. PD 3 | 1 | 0 | 1 | 0 | 50.97 | 205 |
| Comp. PD 4* | 1% AA | 0.5 | — | — | 51.33 | 204 |
| Comp. PD 5* | 1% MAA | 0.5 | — | — | 51.65 | 205 |
| Comp. PD 6 | 0.3 | 1 | 1.3 | 0.77 | 50.90 | 213 |

*Comp. PDs 4 and 5 used respectively 1% AA, and 1% MAA replacing IA.

2. Preparation for Paint Formulations

Paints containing different Polymer Dispersions were prepared using the following procedure as shown in Table 2. The grind ingredients were mixed using a high speed Cowles disperser, and the let-down ingredients were added using a conventional lab mixer.

TABLE 2

| Material | Weight (g) |
|---|---|
| "Grind" | |
| Water | 300 |
| CELLOSIZE QP-30000 thickener | 3 |
| AMP-95 neutralizer | 2 |
| Dispelair CF-246 defoamer | 2 |
| OROTAN 1288 dispersant | 7 |
| TRITON BD-405 wetting agent | 2 |
| SR-237 titanium dioxide | 30 |
| DB-80 calcined clay | 80 |
| ASP 170 extender | 60 |
| CC-700 calcium carbonate | 310 |
| ROCIMA 363 biocide | |
| "Let-down" | |
| Water | 31 |
| TEXANOL coalescent | 9 |
| Propylene glycol | 9 |
| KATHON LXE biocide | 2 |
| DISPELAIR CF-246 defoamer | 1 |

TABLE 2-continued

| Material | Weight (g) |
| --- | --- |
| Polymer Dispersion | 120 |
| ACRYSOL TT-935 thickener | 4 |
| Water | 26 |
| Total | 1000 |
| PVC | 78% |

IV. Results

TABLE 3

| Paint | Polymer Dispersion | Washability | ΔKU | Chalk rating |
| --- | --- | --- | --- | --- |
| C1 | PD 1 | 262% | 7.5 | 7 |
| C2 | PD 2 | 227% | 9 | 7 |
| C3 | PD 3 | 200% | 10 | 5 |
| C4 | PD 4 | 200% | 8 | 7 |
| C5 | PD 5 | 252% | 3.7 | 8 |
| C6 | PD 6 | 264% | 3 | 5 |
| C7 | PD 7 | 248% | 6 | 7 |
| Comp. 8 | Comp. PD 1 | 100% | 4.3 | 2 |
| Comp. 9 | Comp. PD 2 | 318% | 18 | 8 |
| Comp. 10 | Comp. PD 3 | 243% | 2.8 | 3 |
| Comp. 11 | Comp. PD 4 | 164% | 0.9 | 6 |
| Comp. 12 | Comp. PD 5 | 159% | 3.9 | 7 |
| Comp. 13 | Comp. PD 6 | 243% | 14.4 | 8 |

The results were shown in Table 3. Comparative Paint 8 (Comp. 8) was a paint formulation comprising a poly(vinyl acetate) dispersion, and had a poor early chalking resistance (chalk rating being 2). With the same vinyl acetate concentrations, Comparative Paints 9 (Comp. 9) and 10 (Comp. 10) further and respectively comprised the phosphorus-containing allylic monomer (COPS-3), and the itaconic acid (IA) of the present invention, compared to Comp. 8, both Comp. 9 and Comp. 10 improved in paint washability performance, while either of them still had very serious paint stability issue (Comp. 9 had a ΔKU of 18) or early chalking issue (Comp. 10 had a chalk rating of 3). This indicated the important role of either the phosphorus-containing allylic monomer or the itaconic acid played to paint early chalking resistance or the paint stability. Still under the same vinyl acetate concentrations, Comparative Paints 11 (Comp. 11) and 12 (Comp. 12) respectively used AA and MAA replacing IA, compared to Paint 4 using IA, had worse paint washability performances. This indicated the critical role of IA to the paint washability. Comparative Paint 13 (Comp. 13) comprised both COPS-3 and IA, while the dry weight ratio of COPS-3/(IA+COPS-3) exceeded the required range, and was 0.77. Comp. 13 had a poor paint stability (ΔKU being 14.4). Under the same vinyl acetate concentrations, Paints 1-7 were good at paint washability, stability and early chalking resistance performances.

What is claimed is:

1. A polymer dispersion comprising by dry weight based on total dry weight of the polymer particles, a) from 60% to 95% a vinyl acetate monomer, b) from 0.2% to 2.5% a phosphorus-containing allylic monomer; and c) from 0.2% to 2.5% an itaconic acid monomer; wherein the total amount of monomers b) and c) is from 0.5% to 2.5% by dry weight based on total dry weight of the polymer particles, and the dry weight ratio of monomer b) to monomers b) and c) is from 0.2 to 0.6, wherein the phosphorus-containing allylic monomer is a monomer of formula (I) $[CH_2=CH-CH_2-R^2-O-]_xP(=O)(OM)_{3-x}$, wherein $R^2$ is a linking divalent group, x is an average number of from 1 to 2, and M is a hydrogen atom or a cationic counter-ion.

2. The polymer dispersion according to claim 1, wherein $R^2$ is a (poly)oxyalkylene group of formula $-[O-A-]_n-$, with A being a group of formula $-CH_2-CH_2-$ or $-CH_2-CH(CH_3)-$, or $-CH(CH_3)-CH_2-$, and n being an average number of at least 1.

3. The polymer dispersion according to claim 1 comprising by dry weight based on total dry weight of the polymer particles, from 1% to 40%, an ethylenically unsaturated nonionic monomer.

4. The polymer dispersion according to claim 3 wherein the ethylenically unsaturated nonionic monomer is selected from versatic vinyl esters, butadiene, α-olefins, $C_2$-$C_{12}$ alkyl esters of (methyl) acrylic acids, any derivative thereof, and any combination thereof.

5. The polymer dispersion according to claim 1 comprising by dry weight based on total dry weight of the polymer particles, from 0.01% to 5%, a stabilizer monomer.

6. The polymer dispersion according to claim 5 wherein the stabilizer monomer is selected from sodium vinyl sulfonate, 2-acrylamido-2-methylpropane sulfonic acid, and any combination thereof.

7. The polymer dispersion according to claim 1 comprising by dry weight based on total dry weight of the polymer particles, up to 3%, an alkoxysilane functionalized monomer.

8. The polymer dispersion according to claim 7 wherein the alkoxysilane functionalized monomer is selected from vinyltrialkoxysilane, (meth)acryloxyalkyltrialkoxysilane, any derivative thereof, and any combination thereof.

9. A paint formulation of pigment volume concentration (PVC) higher than 60% comprising the polymer dispersion according to claim 1.

* * * * *